United States Patent
Verma et al.

(10) Patent No.: US 9,431,941 B1
(45) Date of Patent: Aug. 30, 2016

(54) METHOD AND APPARATUS FOR DETECTING ALTERNATOR RECTIFIER DIODE SHORT FAULT

(71) Applicant: General Electric Company, Schnectady, NY (US)

(72) Inventors: Rajeev Verma, Bangalore (IN); Bret Dwayne Worden, Erie, PA (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 14/620,218

(22) Filed: Feb. 12, 2015

(51) Int. Cl.
| | |
|---|---|
| H02K 11/00 | (2016.01) |
| H02P 9/00 | (2006.01) |
| H02P 9/10 | (2006.01) |
| H02H 9/00 | (2006.01) |
| H02P 101/45 | (2015.01) |

(52) U.S. Cl.
CPC ........... H02P 9/006 (2013.01); *H02P 2101/45* (2015.01)

(58) Field of Classification Search
USPC .................. 322/58, 59, 99; 361/58; 363/17
See application file for complete search history.

(56) References Cited

U.S. PATENT DOCUMENTS

| | | | | |
|---|---|---|---|---|
| 4,279,007 A | * | 7/1981 | Shimp ...................... | H02H 3/34 361/47 |
| 4,314,193 A | * | 2/1982 | Mortonson .......... | G01R 31/343 320/123 |
| 4,315,204 A | * | 2/1982 | Sievers ................ | G01R 31/007 322/28 |
| 4,348,629 A | * | 9/1982 | Sievers ................ | G01R 31/007 320/137 |
| 4,379,990 A | * | 4/1983 | Sievers ................ | G01R 31/007 320/123 |
| 4,559,486 A | | 12/1985 | Spencer et al. | |
| 5,717,579 A | * | 2/1998 | Sohner ................ | B60L 11/1811 363/17 |
| 5,892,342 A | | 4/1999 | Friedlander et al. | |
| 5,929,610 A | * | 7/1999 | Friedlander .............. | H02H 7/06 318/153 |
| 6,445,141 B1 | * | 9/2002 | Kastner .................. | H05B 37/03 315/219 |
| 6,542,345 B1 | * | 4/2003 | Bauer ...................... | H02H 3/33 361/94 |
| 6,859,107 B1 | | 2/2005 | Moon et al. | |

(Continued)

OTHER PUBLICATIONS

Marathon Electric; Diode Failure Scenarios Modes of Failure, Causes and Effects; Sep. 28, 2004.

(Continued)

*Primary Examiner* — Pedro J Cuevas
(74) *Attorney, Agent, or Firm* — GE Global Patent Operation

(57) ABSTRACT

Methods for detecting a short fault of an alternator rectifier electronic component include sampling a field winding voltage or current signal of an alternator, during operation of the alternator, and determining a fault ripple period at which the alternator field winding signal exceeds a fault threshold. A short fault of an electronic component of a rectifier coupled to the alternator is detected in the event that the fault ripple period closely matches an alternator armature period. Alternatively or additionally, the sampled field winding signal is band pass filtered, and a short fault is detected in the event that an amplitude of the band pass filtered field winding signal exceeds a fault threshold. The methods can be implemented, for example, by an apparatus that includes a hysteresis frequency counter, a frequency comparator, and a countdown timer.

22 Claims, 3 Drawing Sheets

(56) References Cited

U.S. PATENT DOCUMENTS

| | | | | |
|---|---|---|---|---|
| 7,344,202 | B2* | 3/2008 | Linebach | B60L 9/005 303/113.2 |
| 7,480,124 | B2* | 1/2009 | Pankau | H02H 3/253 361/111 |
| 7,562,945 | B2* | 7/2009 | Linebach | B60L 9/005 303/113.2 |
| 8,035,995 | B2* | 10/2011 | Young | H02M 3/3376 363/127 |
| 8,072,191 | B2 | 12/2011 | Maddali et al. | |
| 2002/0018327 | A1* | 2/2002 | Walker | H01F 6/06 361/58 |
| 2006/0255656 | A1* | 11/2006 | Linebach | B60L 9/005 303/113.2 |
| 2008/0179945 | A1* | 7/2008 | Linebach | B60L 9/005 303/122.01 |
| 2008/0180087 | A1* | 7/2008 | Pankau | H02H 3/253 324/76.74 |
| 2014/0049264 | A1* | 2/2014 | Ganesh | G01R 31/025 324/551 |

OTHER PUBLICATIONS

Vishnu B. Kulkarni; Low-Voltage CMOS Comparators With Programmable Hysteresis; Oct. 10, 2005.

* cited by examiner

# METHOD AND APPARATUS FOR DETECTING ALTERNATOR RECTIFIER DIODE SHORT FAULT

BACKGROUND

1. Technical Field

Embodiments of the invention relate generally to power electronics. Other embodiments relate to detecting a shorted diode or other electronic component in an alternator rectifier.

2. Discussion of Art

Generally, electric vehicles develop tractive effort through motors fitted to axles or wheel hubs of the vehicles. These motors receive electrical power from a primary power supply, which may be an electrochemical battery, an ultracapacitor, a photovoltaic panel, or a thermochemical engine. If the primary power supply is a thermochemical engine, it is typical for motion of the engine to drive an alternator (AC generator), which rotates at a multiple of the engine cycle rate. In order to provide a clean source of power regardless of engine speed, the electricity generated in the alternator is passed through an alternator rectifier, and possibly additional power electronics, before delivery to the motors. Nevertheless, rotation of the alternator unavoidably introduces a small AC ripple to the electrical power delivered from the alternator rectifier.

Typically, the alternator rectifier is a solid state device, although it also can be built from discrete components. In any case, if a diode of the alternator rectifier fails short (zero resistance), a large or extremely large AC fault current may flow down to other power electronics, so that continued operation can present a risk of secondary damage to the power electronics as well as to the motors.

Accordingly, some electric vehicles provide for an emergency mode of operation of the vehicle in case of an alternator rectifier diode fault. Also, some electric vehicles automatically enter the emergency mode in response to detecting an alternator rectifier diode fault.

Typically, alternator rectifier diode faults have been detected on the basis of an abrupt or gradual increase in the magnitude of AC ripple in the electrical power delivered from the alternator rectifier. However, to avoid nuisance (false fault) detections, diode fault detection has been disabled for normal operation transients such as motor/alternator (regenerative braking) transition, wheel slip, speed transients, power regulation mode changes, etc. These customary exclusions from fault detection produce the predictable problem that there is a possibility of not detecting an alternator rectifier diode short during normal operations.

In view of the above, it may be desirable to provide apparatus and methods for reliably detecting an alternator rectifier diode short during any normal operations of an electric vehicle, including transients for which diode fault detection previously has been disabled. Such apparatus and methods might also be helpful toward detecting any alternator rectifier diode short fault.

BRIEF DESCRIPTION

In an embodiment, a method (e.g., a method of controlling an electrical power supply system) includes sampling a field winding signal (voltage or current) of an alternator, during operation of the alternator. The alternator is driven by a prime mover to generate electricity. The method further includes determining a fault ripple period at which the field winding signal exceeds a fault threshold, and detecting a short fault in an electronic component of a rectifier coupled to an output of the alternator in the event that the fault ripple period closely matches an armature period of the alternator. "Closely matches" means at or within (i.e., no more than) a designated threshold.

For example, the method may include sampling a field winding voltage of an alternator (during operation of the alternator), determining a fault ripple period at which the alternator field winding voltage exceeds a fault threshold, and detecting an alternator rectifier diode short fault (i.e., a short fault of a diode of a rectifier operably coupled to the alternator) in the event that the fault ripple period closely matches an alternator armature period.

In another embodiment, a method includes sampling a field winding signal (voltage or current) of an alternator, during operation of the alternator. The method further includes band pass filtering the sampled field winding signal, and detecting a short fault of an electronic component (e.g., diode) of a rectifier coupled to an output of the alternator in the event that an amplitude of the band pass filtered field winding signal exceeds a fault threshold.

In another embodiment, an apparatus includes a hysteresis frequency counter that is operatively connected to sample a field winding signal (voltage or current) of an alternator, and to output a value indicative of fault ripple frequency, based on a ripple of the field winding signal exceeding a fault threshold. The apparatus further includes a frequency comparator and a countdown timer that is operatively connected to be actuated by the frequency comparator. The frequency comparator is operatively connected to compare the fault ripple frequency to an armature frequency of the alternator, and to actuate the countdown timer in the event that the fault ripple frequency closely matches the armature frequency. The countdown timer is configured to signal a short fault of an electronic component (e.g., diode) of a rectifier coupled to an output of the alternator in the event that the fault ripple frequency closely matches the armature frequency for a countdown time, e.g., a time that exceeds a design transient duration.

DRAWINGS

The present invention will be better understood from reading the following description of non-limiting embodiments, with reference to the attached drawings wherein below:

DETAILED DESCRIPTION

Figure 1:
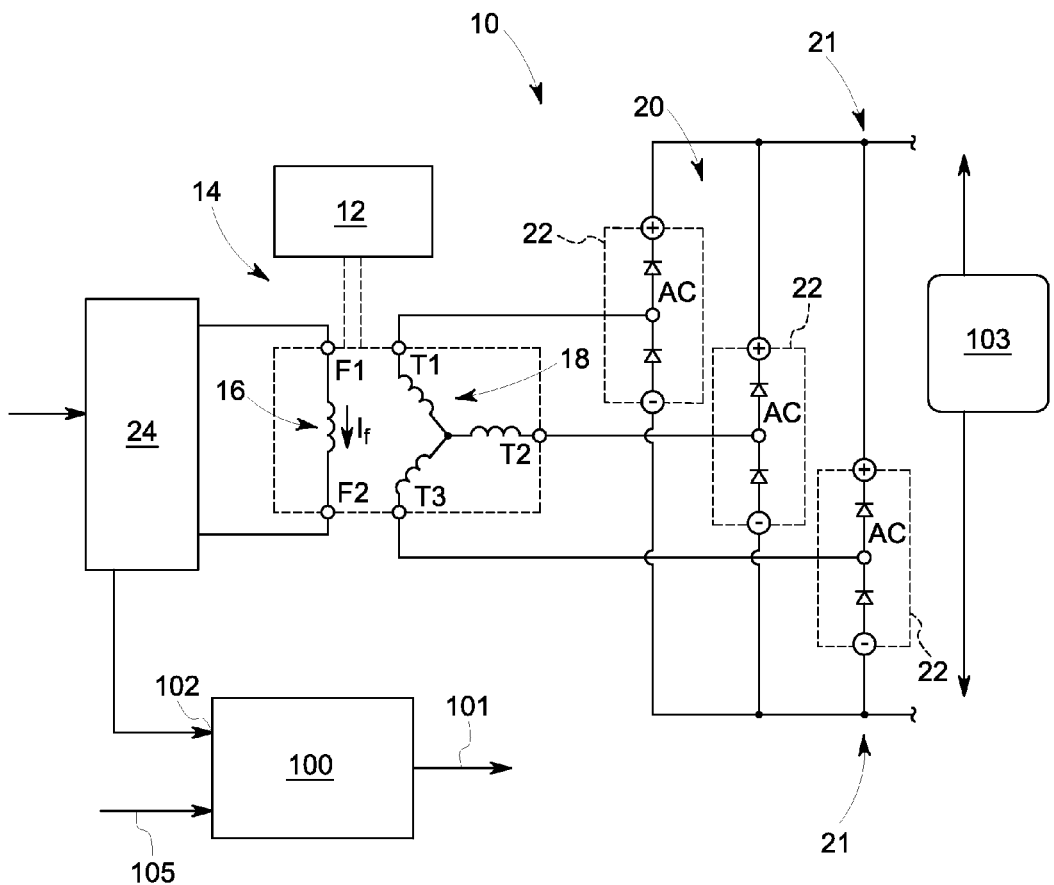
FIG. 1 is a schematic view of an electrical generation system and a fault detection apparatus, according to an embodiment.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to electric vehicles, embodiments of the invention also are applicable for use in alternator-rectifier power systems generally, e.g., as used with turbine generator sets or other generator sets.

As used herein, the terms "substantially," "generally," and "about" indicate conditions within reasonably achievable manufacturing and assembly tolerances, relative to ideal desired conditions suitable for achieving the functional purpose of a component or assembly.

FIG. 1 shows an electrical power supply system 10 that is driven by an engine or other prime mover 12 (e.g., diesel engine, gasoline engine, natural gas engine, multi-fuel engine, hydro-turbine, wind turbine, steam turbine, etc.). The power supply system 10 includes an alternator 14, which has a field winding 16 and a stator winding (armature) 18. Although the armature 18 is shown as a three-phase winding, in other embodiments the armature is single phase. The alternator is operably coupled to a mechanical output (e.g., drive shaft) of the prime mover, for being driven by the prime mover to generate electricity. The power supply system 10 also includes a rectifier 20, inputs of which are connected to an electric output of the armature 18. The rectifier 20 is configured to receive electrical power from the alternator at a first power waveform, and to convert the electrical power to a different power waveform, which is provided at load terminals 21 of a bus. For example, the rectifier may be configured to convert an AC power output of the alternator to DC power available on the bus, e.g., voltages +Ve and −Ve are present at the terminals 21, respectively, when the system is operational. One or more loads 103 are operably coupled to the terminals 21, e.g., the loads may include one or more inverters for controllably converting DC power from the bus to AC signals for powering one or more AC induction motors of an electric vehicle. The rectifier 20 includes plural diodes 22, any of which can compromise the functioning of the alternator rectifier by failing short or open.

Although embodiments are described herein in relation to diodes specifically, other embodiments are applicable to electronic components more generally, which are operably connected in a circuit of a rectifier to convert one or more voltage inputs (e.g., 3-phase AC) to one or more voltage outputs (e.g., DC). Examples include actively-controlled transistors, diode-connected transistors, and the like.

The alternator field winding 16 is driven by an exciter 24, which is connected to receive electrical power from a power source. For example, the exciter 24 may be powered from the DC load terminals 21. Alternatively or additionally, the exciter 24 can be powered from a battery or from another power supply external to the power supply system 10.

For detecting a short fault of an alternator rectifier diode or other electronic component, a fault detector apparatus 100 is operatively connected to the exciter 24 to sense (or receive information about) an electrical signal (voltage and/or current) in the field winding 16. The fault detector apparatus 100 also receives information 105 about (i) a rotational speed of the alternator (e.g., from an engine speed sensor) and/or (ii) a stator (armature) frequency of the alternator, and outputs a signal 101, indicative of a detected short fault, responsive to certain conditions being met, as further discussed below. Although the exciter 24 presumptively supplies DC to the field winding 16, in fact magnetic back-coupling from the electrical field of the armature 18 onto the field winding 16 will always superimpose a small AC ripple voltage ("normal ripple") onto the exciter supply voltage at approximately the rotational frequency of the armature 18 (e.g., between about 25-87 Hz). In this context, "small" means on the order of no more than 1 V, e.g., less than 1 V.

As mentioned above, this relatively small normal ripple can cause nuisance detections (spurious faults) during some normal operating transients.

Figure 2:
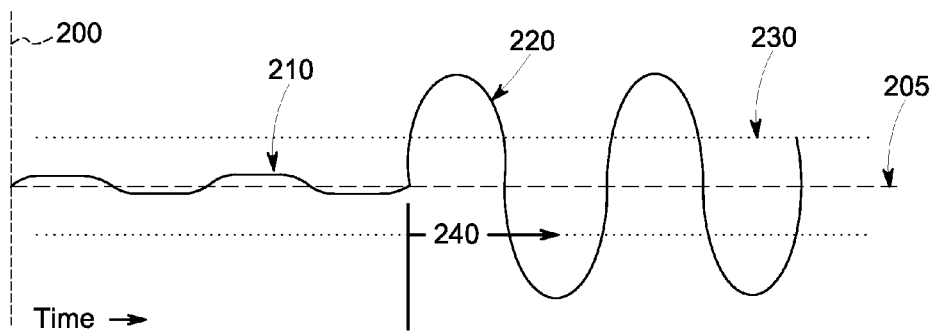
FIG. 2 shows graphically an alternator field winding voltage signal and hysteresis envelope according to an aspect of the invention.

FIG. 2 shows graphically a time progression of a field winding voltage 200, which includes both a baseline DC voltage 205 as well as either the small normal ripple 210 or an abnormally large fault ripple 220 that will be coupled into the field winding 16 in the event that one of the alternator rectifier diodes 22 fails. FIG. 2 also shows a hysteresis envelope or fault threshold 230 that is used for distinguishing the fault ripple 220 from the normal ripple 210. One aspect of the invention involves utilizing the hysteresis envelope 230 in order to detect the fault ripple 220 and to screen out nuisance detections of the normal ripple 210. In certain embodiments the hysteresis envelope 230 is set at a large multiple of the normal ripple amplitude, e.g., at least five times or 500% of the normal ripple amplitude or at least about 5 V. In case certain normal operating transients might cause the normal ripple 210 to exceed 500% of its customary amplitude, then the fault threshold 230 may be set at a larger multiple, e.g., 1000% or 10,000% of the normal ripple amplitude. However, another mode for distinguishing the fault ripple 220 from an unusual transient amplitude of the normal ripple 210 is that normal operating transients should not exceed a design transient duration 240 as shown above the fault ripple 220.

In embodiments, the fault detection apparatus is configured to receive and assess field winding current signals in a manner similar to the voltage signals illustrated in FIG. 2. In other words, the fault detection apparatus may be configured to sense (or receive information relating to) voltages and/or currents in the field winding.

Figure 3:
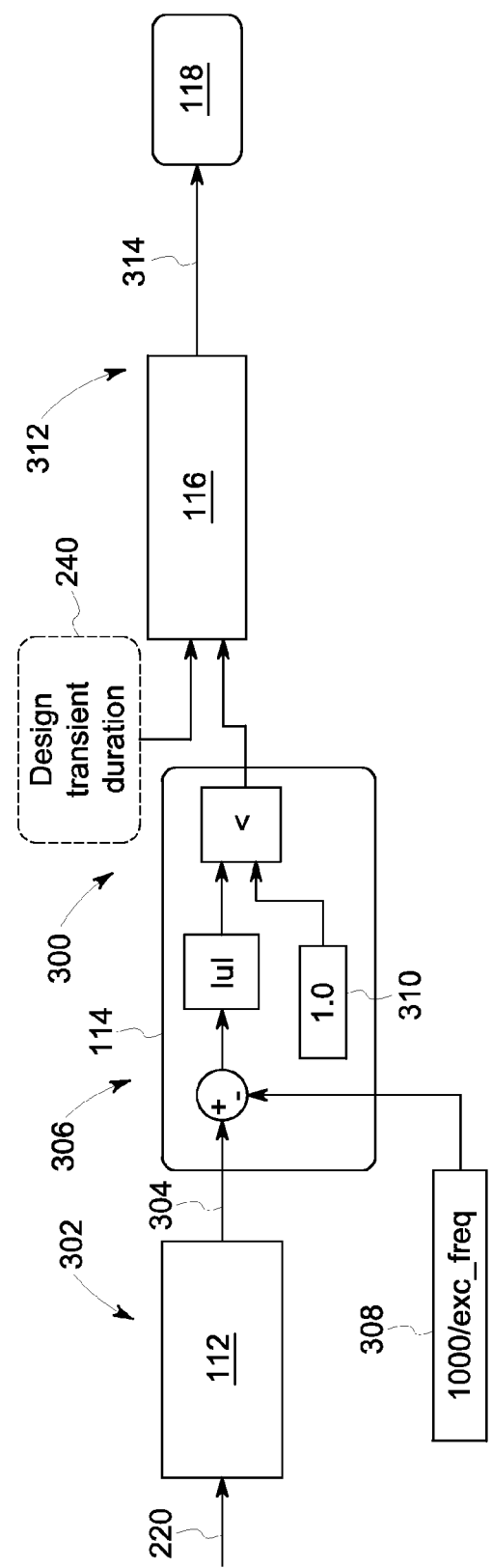
FIG. 3 shows schematically an embodiment of a method for detecting an electrical component short fault (e.g., alternator rectifier diode short fault).

FIG. 3 shows schematically a frequency comparison and counting method 300 that is implemented by the fault detector apparatus 100 for detecting a short fault of a rectifier electronic component (e.g., alternator rectifier diode short fault). According to the method 300, the apparatus 100 determines 302 a fault ripple time period 304 at which the field winding signal (voltage or current) 200 exceeds the fault threshold 230. The apparatus 100 then compares 306 the fault ripple period 304 to an armature winding period 308. (For example, the armature winding period may be determined based on the characteristics of the alternator and a rotational speed of the armature, e.g., provided in information 105.) In the event that the fault ripple period 304 closely matches the armature winding period 308 (meaning at or within, i.e., no more than, a designated threshold 310 of the armature winding period, e.g., at or within a 1 Hz (time equivalent of 1 second) or about 5% frequency difference), the apparatus 100 triggers a countdown 312 that is significantly longer than the armature winding period 308 and also longer than the design transient duration 240. For example, the countdown 312 may be a specific multiple of the armature winding period 308, e.g., at least 20 times longer than the armature winding period 308, or in some applications about 500 msec, so as to allow many confirmation samples of the fault ripple period 304 for a period well beyond the design transient duration 240. In certain implementations of the method 300, the countdown 312 may be limited in duration (e.g., no more than fifty times longer than the armature winding period 308) so as to enable an emergency mode of operation before an actual short fault, or an operating transient that significantly exceeds the design transient duration 240, can cause significant damage to other components. In the event that the fault ripple period 304 continues to closely match the armature winding period 308 throughout the countdown 312, then the fault detector apparatus 100 signals 314 a short fault (i.e., outputs the signal 101).

Figure 4:
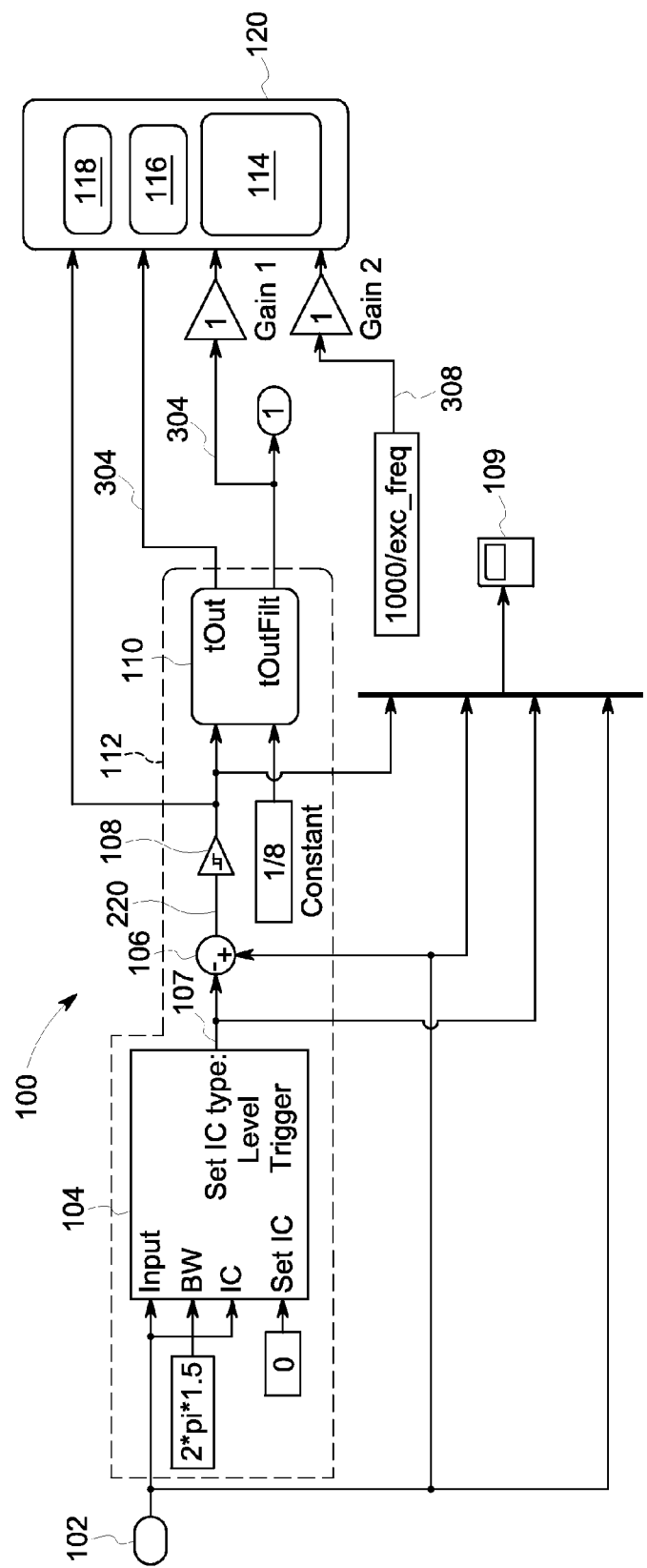
FIG. 4 is a schematic view of the fault detector apparatus of FIG. 1 for implementing the method of FIG. 3, according to an embodiment of the invention.

FIG. 4 is a schematic diagram of an embodiment of the fault detector apparatus 100, e.g., as configured for implementing the method 300. Components of the fault detector apparatus 100 include a field winding signal terminal 102 (e.g., voltage sense terminal) that is operatively connected to provide a voltage or current signal received from the alternator field winding 16 to an active or passive low pass frequency filter 104 and to a ripple subtractor 106. For example, the fault detector 100 may sample the field winding voltage 200 via the terminal 102 at least once every 2 msec (0.002 seconds). The low pass filter 104 may have a passband of 0-1.5 Hz for selecting only a DC component of the field winding signal (e.g., field winding voltage 200). Thus, the low pass filter 104 can be configured to pass through to the subtractor 106 only a DC amplitude 107 of the field winding signal. Because the terminal 102 also is directly connected to the subtractor 106, the subtractor 106 is configured to output only the AC ripple 210 or 220 of the field winding voltage or current signal 200.

The subtractor 106 is operatively connected to supply the AC ripple 210 or 220 to a hysteresis trigger 108 (e.g., a Schmitt trigger or similar threshold circuit). The trigger 108 is set according to the fault threshold 230 as discussed above. Thus, on receiving a fault ripple 220 that exceeds the fault threshold 230, the trigger 108 sends a high signal to a fault ripple timer 110. Otherwise the trigger 108 sends a low signal to the fault ripple timer 110.

In response to receiving a low signal from the trigger 108, the fault ripple timer 110 increments its time value. In response to receiving a high signal from the trigger 108, the fault ripple 110 outputs its current time value (the fault ripple period 304) and resets. Together, the frequency filter 104, the ripple subtractor 106, the trigger 108, and the fault ripple timer 110 are operable as a hysteresis frequency counter 112 that is operatively connected to sample the alternator field winding signal (e.g., alternator field winding voltage signal 200) and to output a value (the fault ripple period 304) that is indicative of a fault ripple frequency, based on the field winding voltage ripple 210 or 220 exceeding the fault threshold 230.

The frequency counter 112 is operatively connected to send the fault ripple period 304 to a frequency comparator 114, which also is operatively connected to receive a value of the armature winding period 308. For example, the armature winding period 308 may be measured similarly to the fault ripple period 304, may be obtained from a lookup table, or may be measured differently from the fault ripple period 304 (e.g., by an optical tachometer). The frequency comparator 114 is configured and operatively connected to send a high signal to a countdown timer 116 in the event that the fault ripple period 304 closely matches the armature winding period 308, e.g., is at or within 1 Hz.

The countdown timer 116 is operatively connected to receive a high/low signal from the frequency comparator 114 and is configured to initiate the countdown 312 after receiving a high signal, to reset after receiving a low signal, or to trip 314 an alarm 118 after completing a count.

Thus, in the event that the fault ripple period 304 closely matches the armature winding period 308 (e.g., at or within 1 Hz or about 5%) then the countdown timer 116 initiates the countdown 312 (e.g., a timeout period of 500 msec). In the event that, during the countdown 312, a new measurement of fault ripple period 304 does not closely match the armature winding period 308, then the countdown timer 116 resets. In the event that the fault ripple period 304 continues to closely match the armature winding period throughout the countdown 312, then after completing the countdown 312 the countdown timer 116 trips the alarm 118 in order to signal 314 a short fault. Thus, the countdown timer 116 is configured to signal 314 a short fault in the event that the fault ripple frequency (inverse of the fault ripple period 304) closely matches the armature frequency (inverse of the armature winding period 308) for a time (the countdown 312) that exceeds the design transient duration 240.

Some or all of these components can be implemented in software or in a dedicated circuit, e.g., an ASIC or FPGA or portion thereof. For example, FIG. 4 shows the frequency comparator 114, countdown timer 116, and alarm 118 all being implemented within a control module 120. The control module may include a controller (or processor) and a memory unit, which stores non-transient instructions that are executed by the controller for carrying out various operations as set forth herein.

The various signals (e.g., field winding signal, DC component of the field winding signal, trigger output) may be provided to a memory unit, system (e.g., vehicle) controller, signal bus (for providing the signals to other points in the apparatus), etc. 109.

Although FIG. 4 shows one embodiment of a fault detector 100 according to the invention, other embodiments are conceivable. For example, rather than timing the fault ripple period 304 (counting the fault ripple frequency) based on the output of the trigger 108, embodiments of the invention could be implemented by sampling the alternator field winding voltage 200, band pass filtering the sampled voltage, and detecting a short fault 316 (e.g., alternator rectifier diode short fault) in the event that an amplitude of the band pass filtered field winding voltage exceeds a fault threshold. The band pass filtering can be accomplished based on the alternator armature frequency (inverse of the armature winding periodicity 308), for example, by tuning the filter 104 with reference to a sampled alternator armature frequency or with reference to a design range of values for alternator armature frequency, or by selecting the filter 104 from among a plurality of band pass filters based on an operating condition of the prime mover 12 or based on a rotational speed of the alternator 14. The fault threshold may be adjusted or set based on an operating condition of the prime mover 12. As another example, embodiments of the invention could be implemented by obtaining a running spectral density of the alternator field winding voltage 200 and identifying whether a local maximum of the spectral density closely matches the alternator armature frequency (inverse of the armature winding period 308) and exceeds the fault threshold 230 for a time that exceeds the design transient duration 240.

Thus, embodiments of the invention relate to a method that includes sampling (e.g., with a fault detection apparatus) a field winding signal (voltage or current signal) of an alternator, during operation of the alternator. The method further includes determining (e.g., with the fault detection apparatus) a fault ripple period at which the alternator field winding signal exceeds a fault threshold, and detecting (e.g., with the fault detection apparatus) a short fault of a diode or other electronic component of a rectifier (coupled to the alternator) in the event that the fault ripple period closely matches an alternator armature period. Some embodiments may detect the short fault only if the fault ripple period closely matches the alternator armature period throughout a countdown, e.g., at or within a 1 Hz frequency difference. The fault threshold may be, e.g., at least 500% of a normal ripple amplitude, or at least 10,000% of a normal ripple amplitude. The countdown may be at least twenty times the alternator armature period, and/or no more than fifty times the alternator armature period. (Countdowns longer than fifty times the alternator armature period may be applicable in situations, depending on the particular characteristics of the alternator and electrical power generation system, where additional confirmation samples are deemed useful and/or where a mode of operation that is triggered within a relatively short time of a possible fault is not needed. Countdowns shorter than twenty times the alternator armature period may be applicable in situations, again, depending on the particular characteristics of the alternator and electrical power generation system, where relatively fewer confirmation samples are needed.) The fault ripple period may be determined by obtaining a spectral density of the field winding voltage.

Other embodiments implement a method that includes sampling (e.g., with a fault detection apparatus) a field winding signal (current or voltage) of an alternator, during operation of the alternator, and band pass filtering (e.g., with the fault detection apparatus) the sampled field winding signal. The method further includes detecting (e.g., with the fault detection apparatus) a short fault of an electronic component (e.g., diode) of a rectifier coupled to the alternator in the event that an amplitude of the band pass filtered field winding signal exceeds a fault threshold. The band pass filtering may be accomplished by tuning a band pass filter with reference to a sampled alternator armature frequency, or by using a filter set to a design range of values for an alternator armature frequency, or by selecting one of a plurality of band pass filters based on an operating condition of an engine that drives the alternator. The band pass filtering may be accomplished by selecting one of a plurality of band pass filters based on a rotational speed of the alternator. The fault threshold may be set based on an operating condition of an engine or other prime mover that drives the alternator.

Other embodiments provide an apparatus that includes a hysteresis frequency counter that is operatively connected to sample an alternator field winding signal (voltage or current signal) and to output a value indicative of fault ripple frequency, based on a ripple of the field winding voltage exceeding a fault threshold. The apparatus further includes a frequency comparator and a countdown timer that is operatively connected to be actuated by the frequency comparator. The frequency comparator is operatively connected to compare the fault ripple frequency to an alternator armature frequency, and to actuate the countdown timer in the event that the fault ripple frequency closely matches the armature frequency. The countdown timer is configured to signal a short fault in the event that the fault ripple frequency closely matches the armature frequency (e.g., at or within a 1 Hz frequency difference) for a time that exceeds a design transient duration. The fault threshold may be, e.g., at least 500% of a normal ripple amplitude or at least 10,000% of a normal ripple amplitude. The countdown may be at least twenty times the alternator armature period, and/or no more than fifty times the alternator armature period.

In embodiments, the fault detector apparatus is configured, responsive to detecting a short fault, to one or more of generate a signal for controlling a device to log information of the fault in a memory unit, to generate a signal for controlling a device or system in which the alternator rectifier is disposed (e.g., to automatically control a vehicle in which the alternator rectifier is disposed, to bring the vehicle to a designated mode of operation, to stop the vehicle, to prevent the vehicle when stopped from moving, to automatically or otherwise control movement of the vehicle to a designated location, to automatically control a generator to a de-rated or turned off mode of operation, etc.), to generate a signal for automatically scheduling maintenance on the alternator rectifier, and/or otherwise to generate a signal for communicating information of the fault to another device or system (e.g., either on-board or off-board a vehicle in which the alternator rectifier is disposed).

In an embodiment, a method comprises sampling a field winding signal of an alternator, during operation of the alternator. The method further comprises determining a fault ripple period at which the alternator field winding signal exceeds a fault threshold. The method further comprises detecting a short fault of an electronic component of a rectifier coupled to the alternator if a difference between the fault ripple period and an alternator armature period is no more than a designated threshold (e.g., no more than the designated threshold throughout a countdown time).

In another embodiment, an apparatus comprises a hysteresis frequency counter, a countdown timer, and a frequency comparator. The hysteresis frequency counter is operatively connected to sample a field winding signal of an alternator and to output a value indicative of a fault ripple frequency, based on a ripple of the field winding voltage exceeding a fault threshold. The frequency comparator is operatively connected to compare the fault ripple frequency to an alternator armature frequency, and to actuate the countdown timer in the event that a difference between the fault ripple frequency and the armature frequency is no more than a designated threshold. The countdown timer is operatively connected to be actuated by the frequency comparator, and is configured to signal a short fault of an electronic component of a rectifier coupled to the alternator in the event that the difference (between the fault ripple frequency and the armature frequency) is no more than the designated threshold for a countdown time.

In another embodiment, an apparatus comprises a hysteresis frequency comparator that is configured to: sample a field winding signal of an alternator, during operation of the alternator; determine a fault ripple period at which the alternator field winding signal exceeds a fault threshold; and detect a short fault of an electronic component of a rectifier coupled to the alternator in the event that the fault ripple period closely matches an alternator armature period.

In another embodiment, an apparatus comprises a hysteresis frequency comparator that is configured to: sample a field winding signal of an alternator, during operation of the alternator; band pass filter the field winding signal that is sampled; and detect a short fault of an electronic component of a rectifier coupled to the alternator in the event that an amplitude of the band pass filtered field winding voltage exceeds a fault threshold.

In another embodiment, an electrical power supply system includes a prime mover, an alternator that is coupled for being driven by the prime mover to generate electricity, a rectifier coupled to an output of the alternator and configured to convert a first power signal that is output by the alternator to a different, second power signal, one or more loads coupled to receive the second power signal, and a fault detection apparatus coupled to receive information about the alternator in operation. The rectifier includes plural diodes and/or other electronic components. The fault detection apparatus is configured to sample a field winding signal of the alternator, during operation of the alternator. The fault detection apparatus is further configured to determine a fault ripple period at which the field winding signal exceeds a fault threshold, and to detect a short fault of one of the electronic components of the rectifier in the event that the fault ripple period closely matches an armature period of the alternator. Responsive to detecting the short fault, the fault apparatus is configured to generate a signal to control the electrical power supply system, a device in which the electrical power supply system is disposed (e.g., a vehicle), or some other device.

In another embodiment, an electrical power supply system includes a prime mover, an alternator that is coupled for being driven by the prime mover to generate electricity, a rectifier coupled to an output of the alternator and configured to convert a first power signal that is output by the alternator to a different, second power signal, one or more loads coupled to receive the second power signal, and a fault detection apparatus coupled to receive information about the alternator in operation. The rectifier includes plural diodes and/or other electronic components. The fault detection apparatus is configured to sample a field winding signal of the alternator, during operation of the alternator. The fault detection apparatus is further configured to band pass filter the field winding signal that is sampled, and to detect a short fault of one of the electronic components of the rectifier in the event that an amplitude of the band pass filtered field winding signal exceeds a fault threshold. Responsive to detecting the short fault, the fault apparatus is configured to generate a signal to control the electrical power supply system, a device in which the electrical power supply system is disposed (e.g., a vehicle), or some other device.

In another embodiment, an electrical power supply system includes a prime mover, an alternator that is coupled for being driven by the prime mover to generate electricity, a rectifier coupled to an output of the alternator and configured to convert a first power signal that is output by the alternator to a different, second power signal, one or more loads coupled to receive the second power signal, and a fault detection apparatus coupled to receive information about the alternator in operation. The rectifier includes plural diodes and/or other electronic components. The fault detection apparatus includes a hysteresis frequency counter that is operatively connected to sample a field winding signal of the alternator and to output a value indicative of a fault ripple frequency, based on a ripple of the field winding signal exceeding a fault threshold. The fault detection apparatus further includes a frequency comparator and a countdown timer that is operatively connected to be actuated by the frequency comparator. The frequency comparator is operatively connected to compare the fault ripple frequency to an alternator armature frequency, and to actuate the countdown timer in the event that the fault ripple frequency closely matches the armature frequency. The countdown timer is configured to generate a signal indicative of a short fault of one of the electronic components of the rectifier in the event that the fault ripple frequency closely matches the armature frequency for a countdown time. The electrical power supply system may be configured for the signal to be routed to control the electrical power supply system, a device in which the electrical power supply system is disposed (e.g., a vehicle), or some other device.

In another embodiment, a vehicle includes an embodiment of the aforementioned electrical power supply system, one or more inverters coupled as one or more of the loads, and one or more traction motors (motors used to propel a vehicle) connected to receive electrical power from the inverters. The signal generated responsive to detecting a short fault is routed to control the electrical power supply system and/or movement of the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    sampling a field winding signal of an alternator, during operation of the alternator;
    determining a fault ripple period at which the field winding signal exceeds a fault threshold; and
    detecting a short fault of an electronic component of a rectifier coupled to an output of the alternator in the event that the fault ripple period closely matches an armature period of the alternator.

2. The method of claim 1 wherein the short fault is detected only if the fault ripple period closely matches the armature period throughout a countdown.

3. The method of claim 2 wherein the countdown is at least twenty times the armature period.

4. The method of claim 2 wherein the countdown is no more than fifty times the armature period.

5. The method of claim 2 wherein the countdown is at least twenty times the armature period and no more than fifty times the armature period.

6. The method of claim 1 wherein the short fault is detected if a difference between the fault ripple period and the armature period is no more than 1 Hz.

7. The method of claim 1 wherein the fault threshold is at least 500% of a normal ripple amplitude.

8. The method of claim 1 wherein the fault threshold is at least 10,000% of a normal ripple amplitude.

9. The method of claim 1 wherein the fault ripple period is determined by obtaining a spectral density of the field winding signal.

10. A method comprising:
sampling a field winding signal of an alternator, during operation of the alternator;
band pass filtering the field winding signal that is sampled; and
detecting a short fault of an electronic component of a rectifier coupled to an output of the alternator in the event that an amplitude of the band pass filtered field winding signal exceeds a fault threshold.

11. The method of claim 10 wherein the band pass filtering is accomplished by tuning a band pass filter with reference to a sampled alternator armature frequency.

12. The method of claim 10 wherein the band pass filtering is accomplished by using a filter set to a design range of values for an alternator armature frequency.

13. The method of claim 10 wherein the band pass filtering is accomplished by selecting one of a plurality of band pass filters based on an operating condition of a prime mover that drives the alternator.

14. The method of claim 10 wherein the band pass filtering is accomplished by selecting one of a plurality of band pass filters based on a rotational speed of the alternator.

15. The method of claim 10 wherein the fault threshold is set based on an operating condition of a prime mover that drives the alternator.

16. An apparatus comprising:
a hysteresis frequency counter that is operatively connected to sample a field winding signal of an alternator and to output a value indicative of a fault ripple frequency, based on a ripple of the field winding signal exceeding a fault threshold;
a countdown timer; and
a frequency comparator that is operatively connected to compare the fault ripple frequency to an alternator armature frequency, and to actuate the countdown timer in the event that the fault ripple frequency closely matches the armature frequency;
wherein the countdown timer is operatively connected to be actuated by the frequency comparator, and is configured to signal a short fault of an electronic component of a rectifier coupled to an output of the alternator in the event that the fault ripple frequency closely matches the armature frequency for a countdown time.

17. The apparatus of claim 16 wherein the countdown timer is configured to signal the short fault if a difference between the fault ripple frequency and the armature frequency is no more than 1 Hz for the countdown time.

18. The apparatus of claim 16 wherein the fault threshold is at least 500% of a normal ripple amplitude.

19. The apparatus of claim 16 wherein the fault threshold is at least 10,000% of a normal ripple amplitude.

20. The apparatus of claim 16 wherein the countdown time is at least twenty times an armature period of the alternator.

21. The apparatus of claim 16 wherein the countdown time is no more than fifty times an armature period of the alternator.

22. The apparatus of claim 16 wherein the countdown time is at least twenty times an armature period of the alternator and no more than fifty times the armature period.

* * * * *